May 28, 1957  E. STUMP  2,793,535
HAND-BRAKE OPERATING DEVICE
Filed May 14, 1953
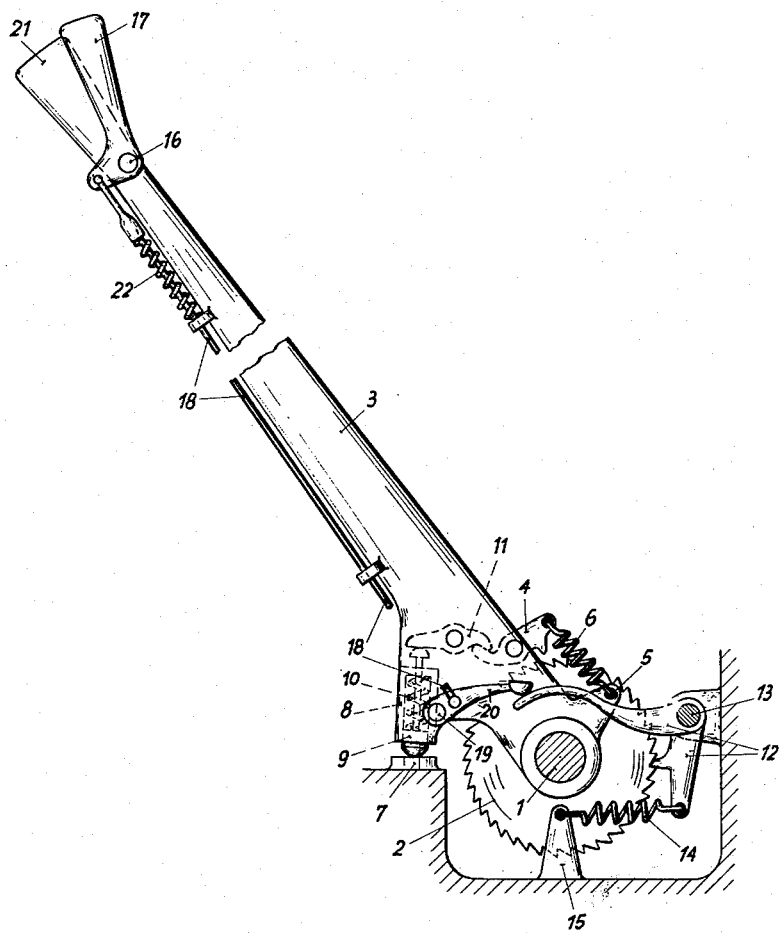
INVENTOR.
EUGEN STUMP.
BY *Dicke, Padlow and Craig.*
ATTORNEYS.

2,793,535

HAND-BRAKE OPERATING DEVICE

Eugen Stump, Stuttgart-Unterturkheim, Germany, assignor to Daimler-Benz Aktiengesellschaft, Stuttgart-Unterturkheim, Germany Application May 14, 1953, Serial No. 354,961

Claims priority, application Germany May 20, 1952

4 Claims. (Cl. 74—152)

This invention relates to a hand-brake operating device and more particularly to such a one adapted for use in vehicles.

An important object of the present invention is to provide a hand-brake operating device including novel and improved means so designed as to permit returning the hand-brake lever to its position of rest when the brake is applied, which primarily for reasons of space is often desirable.

Another object of the present invention is to provide a hand-brake operating device having means devised to permit "compound leverage" in applying the hand brake, i. e. making it possible to perform the operation of applying the brake in two steps, which in the interest of a large transmission ratio between hand lever and brake shoe is of particular advantage and sometimes necessary especially in heavy vehicles.

A further object of the present invention is the provision of a hand brake affording the foregoing possibilities and which as so-called "coaster hand-brake arrangement" is easy to operate and absolutely foolproof.

A further object of the present invention relates particularly to hand-brake operating means, in which the operating movement is transmitted to a ratchet wheel by means of a motion communicating ratchet mechanism, in which the unintended backward motion of the ratchet wheel caused by the action of the brake return springs is prevented by a retaining pawl, in which the release of the retaining pawl is actuated by means of a directly hand-operated releasing device attached to the hand-brake lever, the release of the retaining pawl being effected by a fixed stop, in that a movable member of the stop releasing device attached to the hand-brake lever is pressed against said stop when the hand-brake lever is shifted to its extreme position of rest. Thus is achieved that disengagement of the retaining pawl is actuated in conventional manner by an operating member attached to the handle of the hand-brake lever, and that disengagement of the motion communicating ratchet mechanism (for the purpose of releasing the brakes completely) is in logical manner effected by shifting the hand-brake lever to its extreme position of rest.

A still further object of the present invention is the provision of means for preventing unintentional complete release of the brake when returning the hand-brake lever to its extreme position of rest in that shifting into the extreme position of rest is opposed by a spring-loaded mechanical point of resistance. The arrangement being advantageously such a one that this is accomplished without any effort or thought on the part of the operator in that the hand-operated operating member for the hand releasing device of the retaining pawl is constrainedly operated on shifting the hand-brake lever into its extreme position of rest.

In order to explain the invention further a preferred embodiment thereof as applied to a hand-brake operating device will now be described by way of example, with reference to the accompanying diagrammatic drawing.

In the single figure, the numeral 1 indicates a brake shaft which, on the one hand, is connected with a hand-brake rod (not shown) and, on the other hand, carries splined thereon a ratchet wheel 2 and loosely mounted thereon a hand-brake lever 3. The motion communicating ratchet mechanism comprises a pawl 4 rotatably mounted on the hand-brake lever 3, said pawl being urged into engagement with the ratchet wheel 2 by a tension spring 6 attached to the eye 5 of the hand-brake lever 3. The releasing device for this motion communicating ratchet mechanism is composed of a fixed stop 7, a cylinder 8 attached to the hand-brake lever 3, a member 9 adapted for movement within the cylinder 8 against the action of a spring 10, and a transmission lever 11 rotatably mounted on the hand-brake lever 3 and being in non-positive engagement, on the one hand, with that portion of the movable member 9 extending through the top of the cylinder 8 and, on the other hand, with the pawl 4.

The major part of the retaining pawl is the dog 12. It is mounted upon the shaft 13 which is fixedly mounted on the vehicle structure and is urged into engagement with the ratchet wheel 2 by the pull or tension of a spring 14 likewise attached to the vehicle frame 15. A hand lever 17 mounted on the hand-brake lever 3 by a fulcrum pin 16 serves for releasing the retaining pawl. It is connected by a rod 18 (shown broken at two places) with a lever 20 mounted at 19 on the hand-brake lever 3. The lever 20 cooperates with the arcuate portion of the dog 12 formed concentrically with respect to the shaft 1.

The principle of operation is the following: In the drawing the hand-brake operating device is shown in the extreme position of rest of the hand-brake lever 3 at the very moment at which the operator has taken his hand off the same. During the next moment the hand-brake lever 3 will be moved clockwise a short distance into its normal position of rest by the action of the compressed spring 10. With this clockwise movement of the lever 3 the movable member 9 moves downwardly in relation to the hand-brake lever 3 thereby permitting the tension spring 6 to pull the pawl 4 into engagement with the ratchet wheel 2. For the purpose of applying the brake, the operator pulls the hand lever 3 at its handle part 21 in a clockwise direction toward the right. This will engage the pawl 4 carrying the ratchet wheel 2 and therewith the brake shaft 1 with it, with the dog 12 ratcheting idly over the ratchet wheel 2. On completion of the braking movement, the dog 12 prevents the ratchet wheel 2 from moving backwards. If desired, for reasons of space, or for compounded leverage, the hand-brake lever 3 can be pushed back or be returned to its normal position of rest; with the pawl 4 ratcheting at the same time idly over the motionless ratchet wheel 2. Pushing the hand-brake lever 3 back is so easy, respectively the springs 22, 6 as well as 14 are so well proportioned as to each other that the hand lever 17 which is engaged by the pushing hand is not moved at all relative to the handle 21. Not until after the hand-brake lever 3 is, for the purpose of releasing the brake, moved beyond the mechanical point of resistance determined by abutment of the movable member 9 against the fixed stop 7, the resistance against this movement grows with the increase in compressive force of the biased spring 10 in such a manner that the hand lever 17 is moved toward the handle 21, whereby the rod 18 is moved downwardly, the lever 20 exerting pressure upon the dog 12 swinging it about its fulcrum pin 13, releasing the ratchet wheel 2 and therewith the brake shaft 1. In the meantime the pawl 4 has been swung by the above mentioned movable member 9 by way of the transmission member 11 in such a manner that it is no longer in engagement with the ratchet wheel 2, thereby permitting the latter to return to the position of "brake completely released."

The brake, of course, can also be released by releasing the hand-brake lever slowly. In this instance the hand-brake lever remains in its operating position after completion of the braking movement. In order to release the brake, the hand lever 17 is then in conventional manner pulled against the handle 21, thereby disengaging the dog 12 from the ratchet wheel 2 and then locking it by way of the pawl 4.

What is claimed is:

1. A hand-brake operating device comprising a ratchet wheel adapted to release the brakes when moved in one direction of rotation and to apply the brakes when moved in the other direction of rotation, a hand lever freely rotatable with respect to said ratchet wheel, a motion communicating mechanism on said hand lever for engagement with said ratchet wheel in a manner to carry said ratchet wheel therewith when said hand lever is shifted in a brake applying sense, on the one hand, and, on the other, to release said ratchet wheel when said hand lever is shifted in the opposite sense, a retaining pawl mechanism for keeping said ratchet wheel from revolving in the brake releasing direction of rotation when the brake is applied, a releasing mechanism on said hand lever for releasing said retaining pawl mechanism, a spring-loaded arrangement for holding said releasing mechanism in inoperative non-releasing position on said hand lever, means for releasing said retaining pawl mechanism by said releasing mechanism in every position of said hand lever, and a stop mechanism for said hand lever, both said stop and said releasing mechanism being so arranged in relation to said hand lever that said releasing mechanism will be actuated to release said ratchet wheel by said retaining pawl mechanism when said hand lever is shifted in a brake releasing sense against the action of said stop mechanism, said stop mechanism including a fixed stop and a spring-loaded stop member mounted on said hand lever for abutting engagement with said fixed stop when said hand lever is shifted in the brake releasing direction thereby being forced back against the spring action and releasing said motion-communicating mechanism from engagement with said ratchet wheel.

2. A hand-brake operating device comprising a ratchet wheel adapted to release the brakes when moved in one direction of rotation and to apply the brakes when moved in the other direction of rotation, a hand lever freely rotatable with respect to said ratchet wheel, a motion-communicating mechanism on said hand lever for engagement with said ratchet wheel in a manner to carry said ratchet wheel therewith when said hand lever is shifted in a brake applying sense, on the one hand, and, on the other, to release said ratchet wheel when said hand lever is shifted in the opposite sense, a retaining pawl mechanism for keeping said ratchet wheel from revolving in the brake release direction of rotation when the brake is applied, a releasing mechanism on said hand lever for releasing said retaining pawl mechanism, a spring-loaded arrangement for holding said releasing mechanism in inoperative non-releasing position on said hand lever, means for releasing said retaining pawl mechanism by said releasing mechanism in every position of said hand lever, a stop mechanism for said hand lever, both said stop and said releasing mechanism being so arranged in relation to said hand lever that said releasing mechanism will be actuated to release said ratchet wheel by said retaining pawl mechanism when said hand lever is shifted in a brake releasing sense against the action of said stop mechanism, and means for effecting control of said motion-communicating mechanism by said stop mechanism, said stop mechanism being arranged with respect to said motion-communicating mechanism in a manner causing the disengagement thereof from said ratchet wheel when said hand lever is shifted against said stop mechanism, said last-mentioned means including a fixed stop, a spring-loaded member mounted on said hand lever and cooperating with said stop, at least one intermediate member between said spring loaded member and said motion-communicating mechanism in a manner effecting the release of said motion-communicating mechanism from engagement with said ratchet wheel when said spring-loaded member is pushed back against the spring action.

3. A hand-brake operating device comprising a ratchet wheel adapted to release the brakes when moved in one direction of rotation and to apply the brakes when moved in the other direction of rotation, a hand lever freely rotatable with respect to said ratchet wheel, a motion-communicating mechanism on said hand lever for engagement with said ratchet wheel in a manner to carry said ratchet wheel therewith when said hand lever is shifted in a brake applying sense, on the one hand, and, on the other, to release said ratchet wheel when said hand lever is shifted in the opposite sense, a retaining pawl mechanism for keeping said ratchet wheel from revolving in the brake releasing direction of rotation when the brake is applied, a releasing mechanism on said hand lever for releasing said retaining pawl mechanism, a spring-loaded arrangement for holding said releasing mechanism in inoperative non-releasing position on said hand lever, means for releasing said retaining pawl mechanism by said releasing mechanism in every position of said hand lever, and a stop mechanism for said hand lever, both said stop and said releasing mechanism being so arranged in relation to said hand lever that said releasing mechanism will be actuated to release said ratchet wheel by said retaining pawl mechanism when said hand lever is shifted in a brake releasing sense against the action of said stop mechanism, said releasing mechanism comprising a handle movably mounted on said hand lever, resilient means for keeping said handle in inoperative position, a lever arm, and means for connecting said handle with said last-mentioned lever arm, said handle simultaneously constituting the handle for said hand lever in the releasing direction, and said resilient means being so proportioned as to displace said handle against the action of said resilient means on said handle lever to thereby actuate said releasing mechanism only upon exceeding a predetermined pressure, and wherein said means for releasing said retaining mechanism includes an arm fixedly connected with said retaining mechanism and cooperating with said lever arm to release said retaining mechanism upon displacement of said handle in every position of said hand lever.

4. A hand-brake operating device according to claim 3 wherein said first-mentioned lever arm is pivotally connected at the hand lever eccentrically with respect to the axis of rotation thereof, and wherein said second-mentioned lever arm which is rigidly connected with said retaining mechanism is arcuately shaped parallel to the path described by the first-mentioned lever arm during movement of said hand lever and is arranged near said first-mentioned lever arm in such a manner that said first-mentioned lever arm during actuation of said releasing mechanism is operative at all times on said second-mentioned lever arm in the direction of release of said pawl mechanism during actuation of said releasing mechanism.

References Cited in the file of this patent

UNITED STATES PATENTS

| 156,161 | Huntoon | Oct. 20, 1874 |
| 656,379 | Seymour et al. | Aug. 21, 1900 |
| 2,212,165 | Neate et al. | Aug. 20, 1940 |

FOREIGN PATENTS

| 789,281 | France | Oct. 25, 1935 |